United States Patent
Aiba

(10) Patent No.: US 12,547,053 B2
(45) Date of Patent: Feb. 10, 2026

(54) AUTOMATIC FOCUS-ADJUSTING GLASSES, CONTROL METHOD OF AUTOMATIC FOCUS-ADJUSTING GLASSES, AND NON-TRANSITORY STORAGE MEDIUM

(71) Applicant: JVCKENWOOD Corporation, Yokohama (JP)

(72) Inventor: Hideki Aiba, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 230 days.

(21) Appl. No.: 18/462,458

(22) Filed: Sep. 7, 2023

(65) Prior Publication Data

US 2023/0418131 A1  Dec. 28, 2023

Related U.S. Application Data

(63) Continuation of application No. PCT/JP2022/009824, filed on Mar. 7, 2022.

(30) Foreign Application Priority Data

Mar. 12, 2021 (JP) .................. 2021-040337

(51) Int. Cl.
G03B 13/36 (2021.01)
G02B 7/40 (2021.01)
(Continued)

(52) U.S. Cl.
CPC .............. *G03B 13/36* (2013.01); *G02C 7/08* (2013.01); *G03B 13/30* (2013.01); *H04N 23/67* (2023.01); *G02B 7/40* (2013.01)

(58) Field of Classification Search
CPC ................. G02C 7/081; G02C 7/083
See application file for complete search history.

(56) References Cited

U.S. PATENT DOCUMENTS

2012/0127422 A1* 5/2012 Tian ................. G02B 7/365
351/158
2015/0350546 A1* 12/2015 Tang ................. H04N 23/667
348/220.1
(Continued)

FOREIGN PATENT DOCUMENTS

JP  2000-249902  9/2000
JP  2007-212501  8/2007
(Continued)

OTHER PUBLICATIONS

International Search Report and Written Opinion for International Application No. PCT/JP2022/009824 mailed on May 24, 2022, 11 pages.

*Primary Examiner* — Noam Reisner
(74) *Attorney, Agent, or Firm* — Amin, Turocy & Watson, LLP

(57) ABSTRACT

Automatic focus-adjusting glasses includes an imager configured to be capable of acquiring image information; a variable focus lens configured to be capable of changing a focal length; a depth-information acquiring unit configured to acquire depth information of each position of the image information acquired by the imager; an attention-position determining unit configured to determine an attention position in the image information acquired by the imager; a depth-information identifying unit configured to identify a depth of the attention position based on the attention position in the image information determined by the attention-position determining unit and the depth information; and a focal-length controller configured to set a focal length of the variable focus lens based on the depth of the attention position.

3 Claims, 6 Drawing Sheets

(51) Int. Cl.
  *G02C 7/08* (2006.01)
  *G03B 13/30* (2021.01)
  *H04N 23/67* (2023.01)

(56) References Cited

U.S. PATENT DOCUMENTS

2017/0280057 A1* 9/2017 Ashida .................. H04N 23/80
2019/0349515 A1 11/2019 Shimosato
2020/0267309 A1 8/2020 Feng et al.

FOREIGN PATENT DOCUMENTS

| JP | 2011-107550 | 6/2011 |
| JP | 2017-215525 | 12/2017 |
| JP | 2019-200238 | 11/2019 |

* cited by examiner

FIG.1
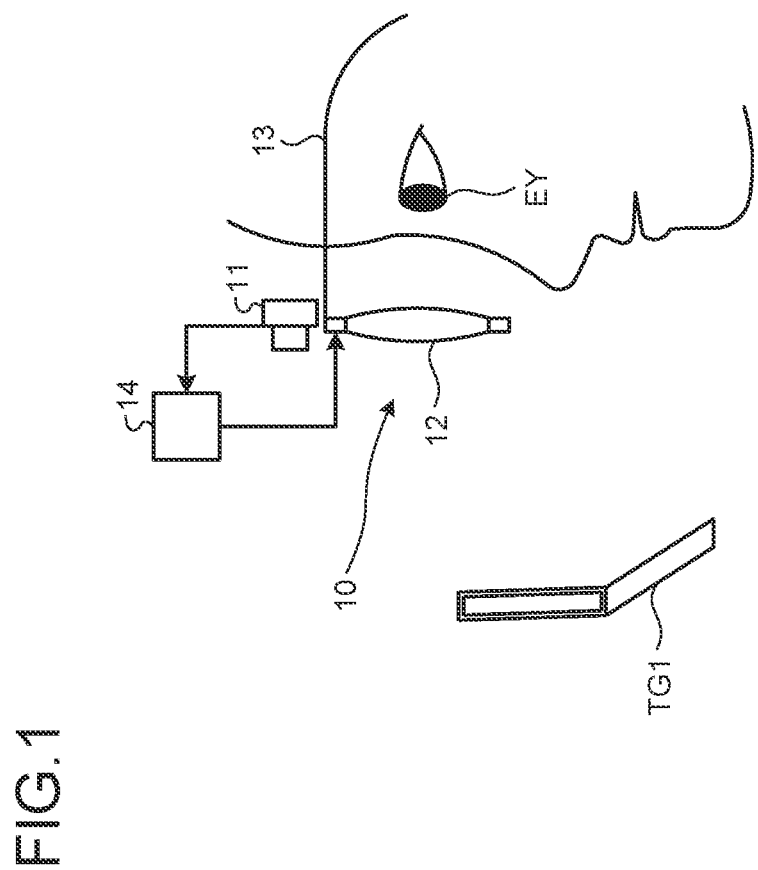
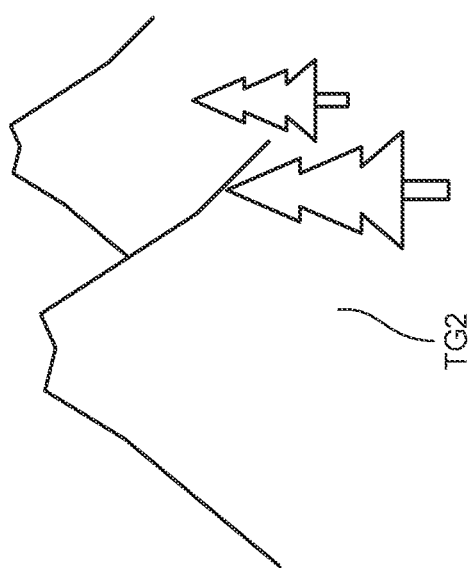

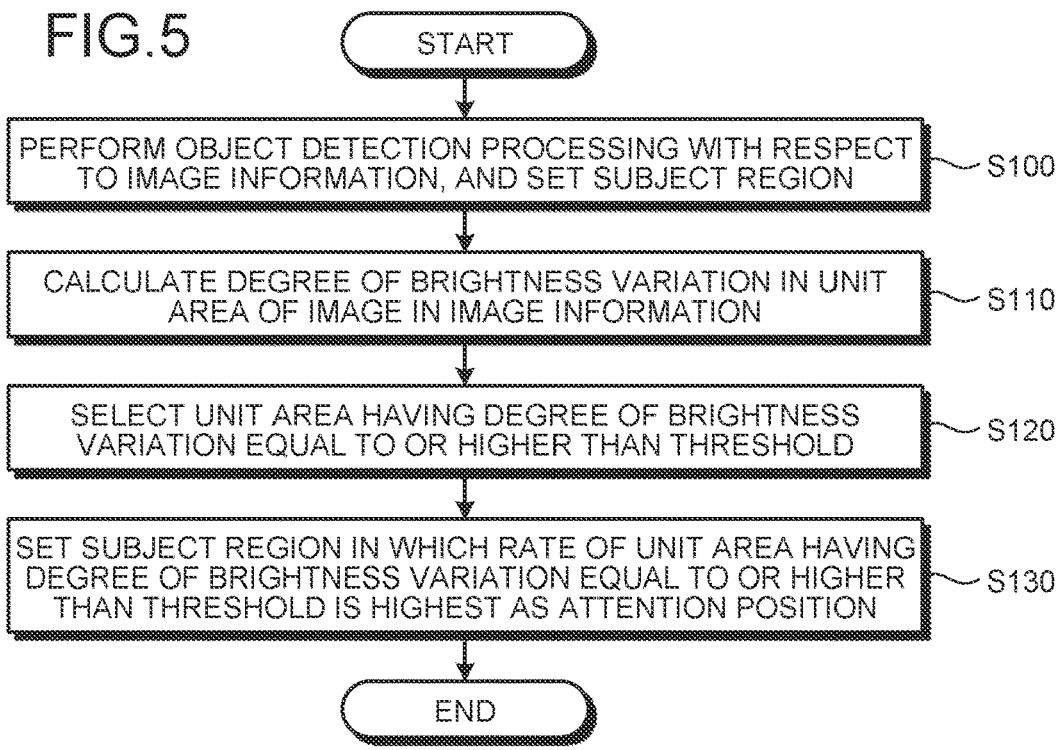
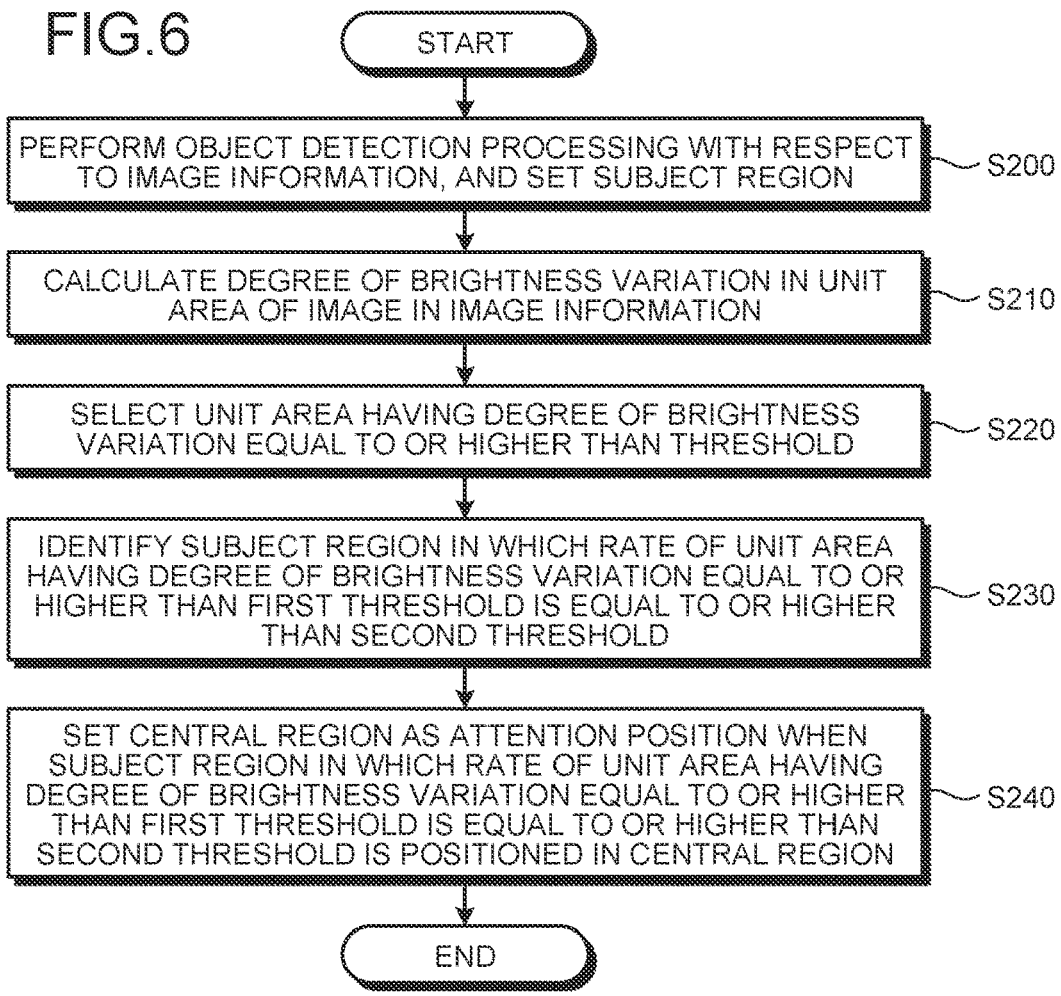

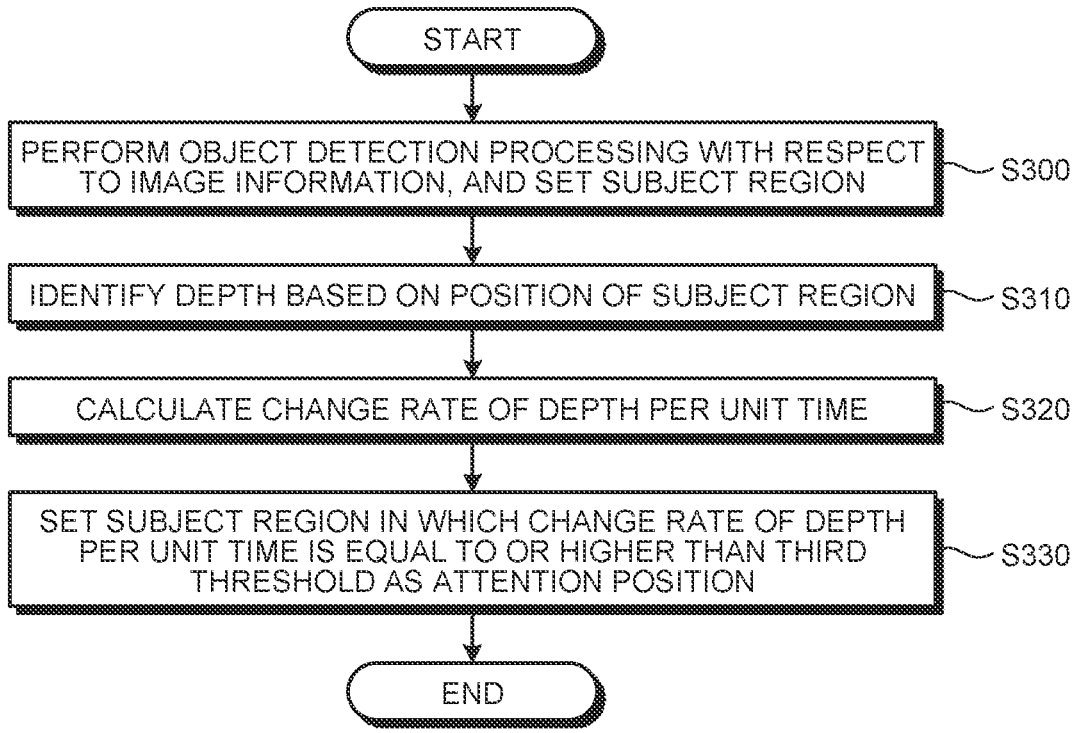
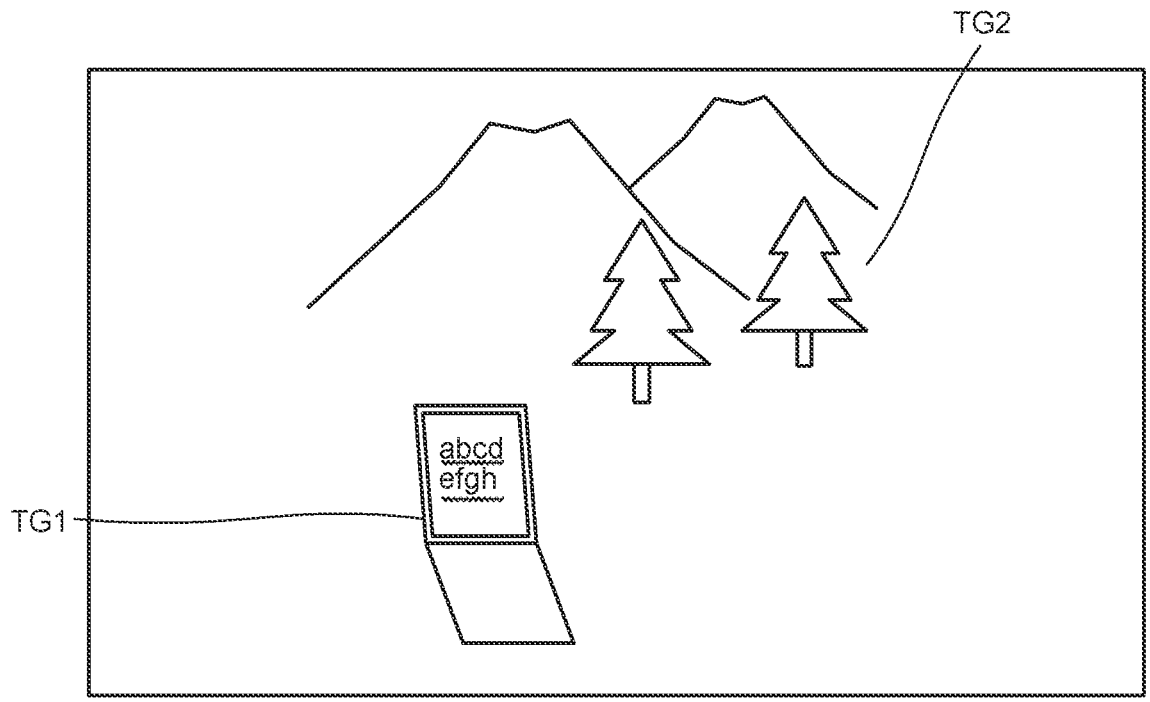

AUTOMATIC FOCUS-ADJUSTING GLASSES, CONTROL METHOD OF AUTOMATIC FOCUS-ADJUSTING GLASSES, AND NON-TRANSITORY STORAGE MEDIUM

CROSS-REFERENCE TO RELATED APPLICATIONS

This application is a Continuation of PCT International Application No. PCT/JP2022/009824 filed on Mar. 7, 2022 which claims the benefit of priority from Japanese Patent Application No. 2021-040337 filed on Mar. 12, 2021, the entire contents of both of which are incorporated herein by reference.

FIELD OF THE INVENTION

The present application relates to automatic focus-adjusting glasses, a control method of automatic focus-adjusting glasses, and a non-transitory storage medium.

BACKGROUND OF THE INVENTION

Automatic focus-adjusting glasses that have a function of automatically adjusting a focal length of lenses of glasses is disclosed, for example, in JP-A-2000-249902 and JP-A-2007-212501. The automatic focus-adjusting glasses disclosed in JP-A-2000-249902 have a practical limitation such that a camera to capture a pupil is necessary to be arranged at a position not obstructing a field of view of eyeglass lens to detect a line of sight of a user. In the automatic focus-adjusting glasses disclosed in JP-A-2007-212501, the focal length is changed as a user touches a frame and, therefore, automatic adjustment of the focal length is not enabled.

In such automatic focus-adjusting glasses, it is beneficial to be able to automatically adjust the focal length without sacrificing practicality.

SUMMARY OF THE INVENTION

Automatic focus-adjusting glasses, a control method of automatic focus-adjusting glasses, and a non-transitory storage medium are disclosed.

According to one aspect of the present application, there is provided automatic focus-adjusting glasses comprising: an imager configured to be capable of acquiring image information; a variable focus lens configured to be capable of changing a focal length; a depth-information acquiring unit configured to acquire depth information of each position of the image information acquired by the imager; an attention-position determining unit configured to determine an attention position in the image information acquired by the imager; a depth-information identifying unit configured to identify a depth of the attention position based on the attention position in the image information determined by the attention-position determining unit and the depth information; and a focal-length controller configured to set a focal length of the variable focus lens based on the depth of the attention position, wherein the attention-position determining unit is further configured to: calculate a degree of brightness variation in a unit area of an image in the image information acquired by the imager, and to set a subject region that includes a unit area having the degree of brightness variation equal to or higher than a threshold as the attention position; detect an object by performing an object detection processing with respect to the image information; identify a depth of the object which is a distance between the imager and the object based on a position of a subject region that includes the detected object in the image information; calculate a change rate of the depth per unit time of the object; and set a position of the object as the attention position when the change rate of the depth per unit time in a approaching direction to the object is equal to or higher than a threshold.

According to one aspect of the present application, there is provided a control method of automatic focus-adjusting glasses that include an imager configured to be capable of acquiring image information, and a variable focus lens configured to be capable of changing a focal length, the method comprising: acquiring depth information of each position in the image information acquired by the imager; determining an attention position in the image information acquired by the imager; identifying a depth of the attention position based on the attention position in the image information and the depth information; and setting the focal length of the variable focus lens based on the depth of the attention position, wherein the determining further comprising: calculating a degree of brightness variation in a unit area of an image in the image information acquired by the imager, and setting a subject region that includes a unit area having the degree of brightness variation equal to or higher than a threshold as the attention position; detecting an object by performing an object detection processing with respect to the image information; identifying a depth of the object which is a distance between the imager and the object based on a position of a subject region that includes the detected object in the image information; calculating a change rate of the depth per unit time of the object; and setting a position of the object as the attention position when the change rate of the depth per unit time in a approaching direction to the object is equal to or higher than a threshold.

According to one aspect of the present application, there is provided a non-transitory storage medium that stores a computer program that causes a computer to execute a control method of automatic focus-adjusting glasses that include an imager configured to be capable of acquiring image information and a variable focus lens configured to be capable of changing a focal length, the control method comprising: acquiring depth information of each position in the image information acquired by the imager; determining an attention position in the image information acquired by the imager; identifying a depth of the attention position based on the attention position in the image information and the depth information; and setting the focal length of the variable focus lens based on the depth of the attention position, wherein the determining further comprising: calculating a degree of brightness variation in a unit area of an image in the image information acquired by the imager, and setting a subject region that includes a unit area having the degree of brightness variation equal to or higher than a threshold as the attention position; detecting an object by performing an object detection processing with respect to the image information; identifying a depth of the object which is a distance between the imager and the object based on a position of a subject region that includes the detected object in the image information; calculating a change rate of the depth per unit time of the object; and setting a position of the object as the attention position when the change rate of the depth per unit time in a approaching direction to the object is equal to or higher than a threshold.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 1 is a schematic diagram illustrating a usage mode of automatic focus-adjusting glasses according to the present application;

FIG. 5 is a flowchart illustrating a first mode of processing of an attention-position determining unit;

FIG. 6 is a flowchart illustrating a second mode of processing of the attention-position determining unit;

FIG. 7 is a flowchart illustrating a third mode of processing of the attention-position determining unit;

FIG. 8 is a schematic diagram illustrating image information acquired by an imager of the automatic focus-adjusting glasses according to the present application.

DETAILED DESCRIPTION OF THE INVENTION

Figure 2:
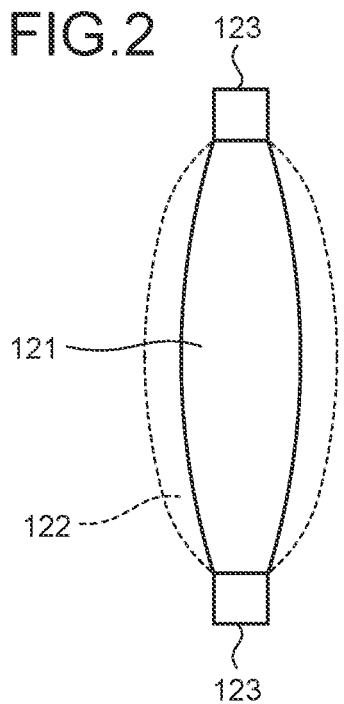
FIG. 2 is a schematic diagram of a first mode of a variable focus lens of the automatic focus-adjusting glasses according to the present application.

Hereinafter, embodiments of the present application will be explained in detail with reference to the drawings. The embodiments explained below are not intended to limit the present application.
Configuration of Automatic Focus-Adjusting Glasses FIG. 1 is a schematic diagram illustrating a usage mode of automatic focus-adjusting glasses according to the present application. As illustrated in FIG. 1, automatic focus-adjusting glasses 10 according to the present application include a depth camera 11, a variable focus lens 12, an eyeglass frame 13, and a control device 14. As illustrated in FIG. 1, a user visually recognizes a short distance object TG1 and a long distance object TG2 through the variable focus lens 12 from an eye EY with wearing the eyeglass frame 13 on ears. Since a focal length of the variable focus lens 12 is automatically adjusted by control of the control device 14, the user can visually recognize both the short distance object TG1 and the long distance object TG2.

Upon acquiring image information, the depth camera 11 simultaneously acquires depth information for each position in the image information. That is, the depth camera 11 includes an imager that acquires image information and a depth-information acquiring unit that acquires depth information of each position in the image information acquired by the imager. The image information is data that includes information of brightness and color of each pixel in one frame, and may be data to which grayscale of each pixel is assigned. Moreover, the depth information is information indicating a distance of an object captured in the image information from the depth camera 11, and a distance from the depth camera 11 is recorded for each position in the image information.

The imager includes an optical device and an imaging device. The optical device is a device that constitutes an optical system, such as a lens, a mirror, a prism, and a filter. The imaging device is a device that converts light entering through the optical device into an image signal which is an electrical signal. The imaging device is, for example, a charge coupled device (CCD) sensor, a complementary metal oxide semiconductor (CMOS) sensor, and the like.

The depth-information acquiring unit acquires depth information for each position of image information. The depth-information acquiring unit may acquire depth information for each position of image information by using, for example, a time of flight (TOF) method. In this case, the depth-information acquiring unit includes a projecting device and a light receiving device, and measures a distance to an object by measuring time from when photons are emitted from the projecting device and hit the object until when reflected light thereof is received by the light receiving device. As the projecting device, for example, a light emitting diode (LED), a laser diode (LD), a vertical cavity surface emitting laser (VCSEL), and the like can be used. Moreover, as the light receiving device, for example, a CCD sensor, a CMOS sensor, and the like can be used.

Furthermore, the depth-information acquiring unit may acquire depth information by inputting image information into a training model trained through unsupervised learning, using data in which an RGB image acquired by using a monocular RGB camera, depth information, a motion vector of an object included in image information, and a motion vector of a camera are associated with one another as training data. Thus, when a moving object is captured in the image information, the depth information of the moving object can be acquired accurately. Moreover, even if the depth camera 11 acquiring image information moves, the depth information of a captured object can be acquired accurately.

An image-information acquiring unit and the depth-information acquiring unit are configured as integral hardware as the depth camera 11 in the present embodiment, but it is not limited thereto, and the image-information acquiring unit and the depth-information acquiring unit may be separated units of hardware. Moreover, the configurations of the image-information acquiring unit and the depth-information acquiring unit are also not limited to the above example, and any configurations may be adopted.

The variable focus lens 12 is a lens that can adjust the focal length. In the following, a form of the variable focus lens 12 will be explained, but the variable focus lens 12 is not limited to the form described below.
First Mode of Variable Focus Lens FIG. 2 is a schematic diagram of a first mode of the variable focus lens of the automatic focus-adjusting glasses according to the present application. The variable focus lens 12 includes, for example, transparent liquid 121, a transparent container 122, and an actuator 123.

The transparent liquid 121 is transparent liquid that is capable of transmitting light. As the transparent liquid 121, for example, pure water or silicone such as polydimethylsiloxane may be used.

The transparent container 122 is a transparent container having flexibility. The transparent container 122 may be formed by laminating two transparent planar materials formed in cylindrical shapes, parabolic shapes, or three-dimensional curved shapes symmetric with respect to a plane. By forming the transparent container into a shape symmetric with respect to a plane, calculation of deformation control becomes easy. In the transparent container 122, the transparent liquid 121 is filled.

The actuator 123 is a mechanical element capable of expansion and contraction movement. For the actuator 123, a mechanism of expanding and contracting a tube by injecting a fluid in the tube manufactured with an elastic material, such as rubber, to change a pressure of the fluid can be used. Moreover, for the actuator 123, a piezo actuator using a piezoelectric material that deforms when a voltage is applied may be used. As the piezoelectric material, a piezoelectric ceramic and a high-polymer piezoelectric material (for example, polyvinylidene fluoride (PVDF)) or a vinylidene fluoride/trifluoroethylene (VDF/TrFE) copolymer, and the like can be used.

The actuator 123 is arranged at positions of upper and lower end portions of the transparent container 122. As the actuator 123 expands and contracts, gaps in the transparent container 122 vary, and the pressure of the transparent liquid 121 filled in the transparent container 122 changes, and the transparent container 122 exhibits elastic deformation. Thus, the focal length of the variable focus lens 12 can be changed.

Second Mode of Variable Focus Lens

Figure 3:
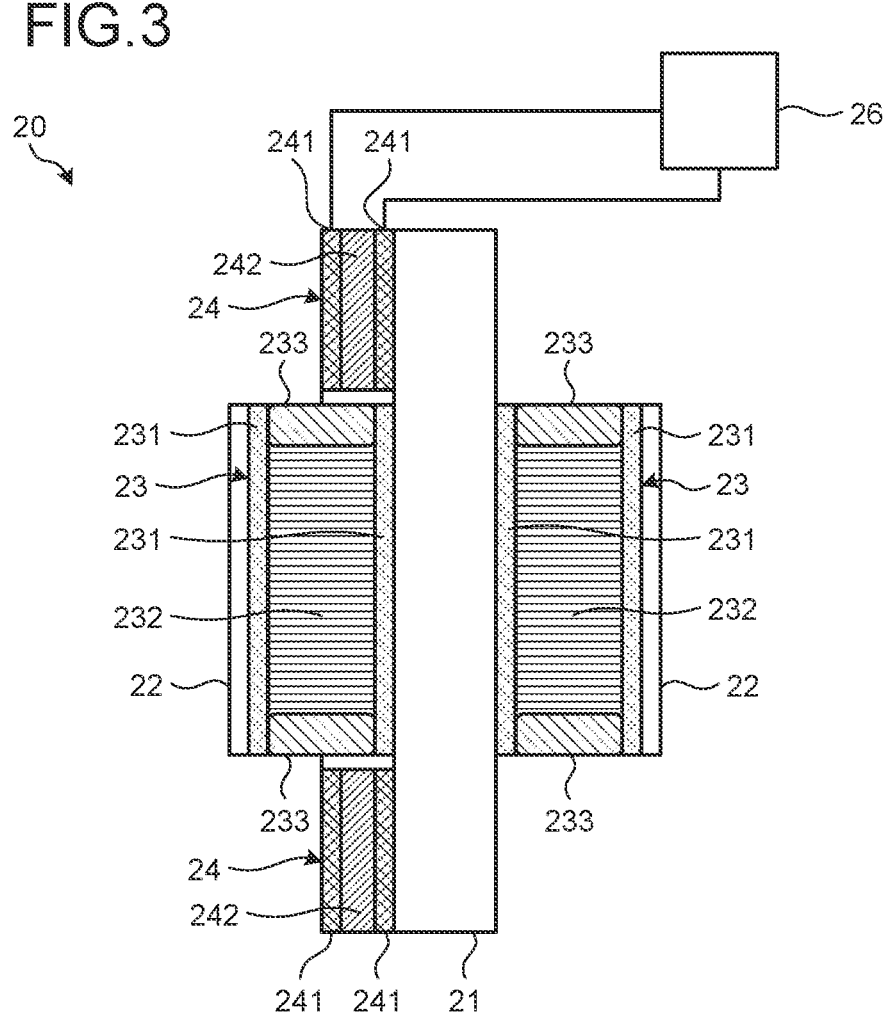
FIG. 3 is a schematic diagram of a second mode of a variable focus lens of the automatic focus-adjusting glasses according to the present application.

FIG. 3 is a schematic diagram of a second mode of the variable focus lens of the automatic focus-adjusting glasses according to the present application. As illustrated in FIG. 3, the variable focus lens may be a liquid-crystal variable focus lens 20 that includes a transparent substrate 21, two outer transparent substrates 22, two liquid crystal lenses 23 arranged to sandwich the transparent substrate 21, an ultrasound transducer 24 arranged on the transparent substrate 21, and a power source unit 26.

The transparent substrate 21 may be a glass plate. The material of the transparent substrate 21 is not limited to glass, but may be, for example, a transparent resin material. A thickness of the transparent substrate is, for example, 100 μm to 900 μm.

The outer transparent substrate 22 may be a glass plate. The outer transparent substrate 22 is arranged on each side of the transparent substrate 21, with one on each side, and between the transparent substrate 21 and the outer transparent substrate 22, the liquid crystal lens 23 described later is arranged.

The liquid crystal lens 23 is constituted of an alignment film 231, a liquid crystal layer 232, and a sealing material 233. The alignment film 231 is a vertical alignment film, and has liquid crystal molecules, long axes of which are aligned perpendicularly to a main surface of the alignment film 231 in a state in which ultrasonic waves are not generated.

The liquid crystal layer 232 includes liquid crystal molecules. As a liquid crystal molecule, for example, a nematic liquid crystal having a negative dielectric constant anisotropy is considered. A thickness of the liquid crystal layer 232 is, for example, 30 μm to 80 μm. By forming the thickness of the liquid crystal layer 232 to be 30 μm or thicker, it is possible to sufficiently broaden a variable range of the focal length of the liquid crystal lens 23. On the other hand, by forming the thickness of the liquid crystal layer 232 to be 80 μm or thinner, it is possible to make the entire thickness of the liquid crystal lens 23 to be sufficiently thin.

The sealing material 233 seals the liquid crystal layer 232 arranged between the transparent substrate 21 and the outer transparent substrate 22. The sealing material 233 is arranged along an outer periphery of the transparent substrate 21 and the outer transparent substrate 22, and seals the liquid crystal layer 232 therebetween. As the sealing material 233, for example, an epoxy resin can be considered.

The ultrasound transducer 24 is arranged on the transparent substrate 21. The ultrasound transducer 24 is constituted of a transducer unit 242 and a pair of electrodes 241 that are arranged to sandwich the transducer unit 242. The electrodes 241 are connected to the power source unit 26. The ultrasound transducer 24 generates ultrasonic waves having a frequency that matches a resonant frequency of the transparent substrate 21 and the liquid crystal lens 23. By the ultrasonic waves having a frequency that matches the resonance frequency, flexural vibrations in a primary mode are generated. The flexural vibrations in the primary mode are vibrations, the vibration strength of which decreases continuously toward a peripheral side from a center of the liquid crystal layer 232. Due to the flexural vibrations in the primary mode, acoustic stationary waves are generated in the liquid crystal layer 232, and an acoustic radiation force further occurs, to change the thickness and the alignment of the liquid crystal layer 232. By these changes, the focal length of the liquid crystal layer 232 changes.

The frequency of ultrasonic waves generated by the ultrasound transducer 24 depends on a frequency of a voltage applied from the power source unit 26. The strength of ultrasonic waves of the ultrasound transducer 24 depends on an amplitude value of the voltage applied from the power source unit 26. By maintaining the frequency of the voltage at a constant value, and controlling the amplitude value of the voltage, it is possible to adjust a degree of variation of a refractive index of the liquid crystal layer 232, and to adjust the focal length of the liquid crystal lens 23. That is, by increasing the amplitude value of the voltage to be applied to the ultrasound transducer 24, the focal length of the liquid crystal lens 23 can be shortened, and on the other hand, by decreasing the amplitude value of the applied voltage, the focal length of the liquid crystal lens can be elongated.

The ultrasound transducer 24 may be, for example, a piezoelectric ultrasound transducer. As a material of the transducer unit 242 of the ultrasound transducer 24, for example, ceramics such as lead zirconate titanate (PZT), barium titanate, and lead titanate, polymers such as copolymer of polyvinylidene fluoride-trifluoroethylene (P (VDF-TrFE)), and the like can be considered.

The material of the electrode 241 is, for example, silver or nickel. The electrode 241 is connected to the power source unit 26 that can apply a voltage. The electrode 241 may be constituted of, for example, a high-temperature sintered silver electrode or a chemically plated nickel electrode. The electrode 241 is electrically connected to the power source unit 26 by wiring.

The frequency of a voltage to be applied from the power source unit 26 to the ultrasound transducer 24 can be calculated by performing simulation using material properties of the transparent substrate 21 and the liquid crystal lens 23 (for example, a Young's modulus, a Poisson's ratio, and density of the transparent substrate 21 and the like), and material properties of the ultrasound transducer 24 (for example, an elastic constant matrix, a density, and a piezoelectric constant matrix of the ultrasonic transducer 24).

The eyeglass frame 13 is a member to which the depth camera 11, the variable focus lens 12, and the control device described later are attached, and that includes temples to make glasses wearable on ears of a user. The control device is not limited to be attached to the eyeglass frame 13, but may be provided externally to the eyeglass frame 13 and is configured to be connected wirelessly or through an electric communication line.

About Controller

Figure 4:
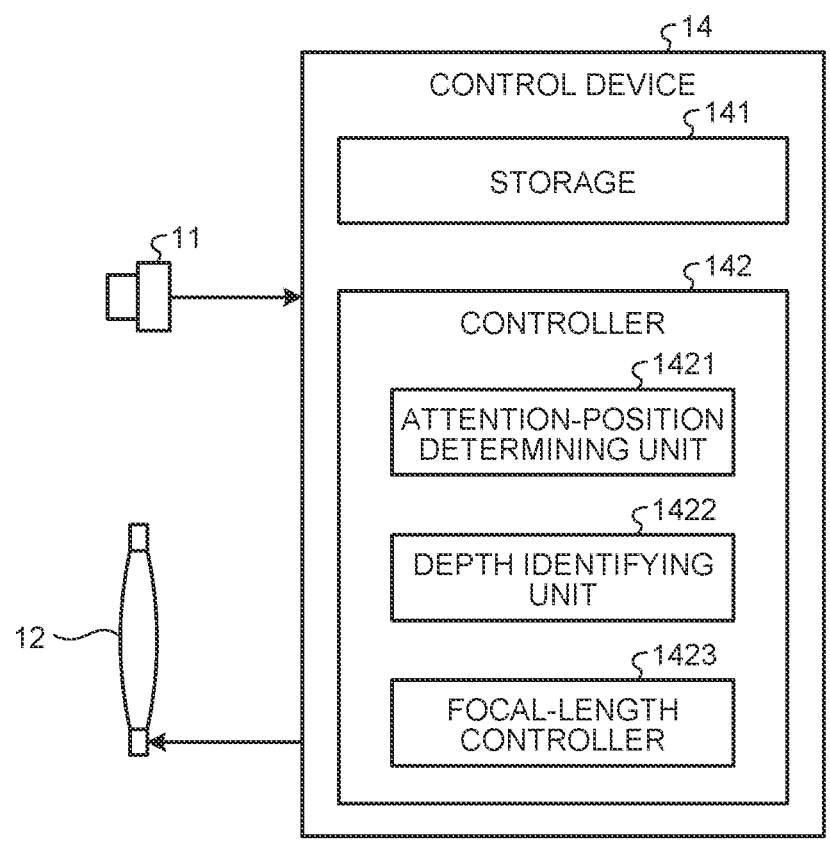
FIG. 4 is a block diagram illustrating a configuration example of a controller of the automatic focus-adjusting glasses according to the present application.

FIG. 4 is a block diagram illustrating a configuration example of the controller of the automatic focus-adjusting glasses according to the present application. The control device 14 is a computer in the present embodiment, and includes a storage 141 and a controller 142. The storage 141 is a memory that stores various kinds of information, such as arithmetic contents of the controller 142, a program, and the like, and includes at least one of a main storage device, such as a random access memory (RAM) and a read only memory (ROM), and an external storage device, such as a hard disk drive (HDD). A program for the controller 142 stored in the storage 141 may be stored in a storage medium that can be read by the controller 142.

The controller 142 is an arithmetic device, and includes, for example, an arithmetic circuit such as a central processing unit (CPU). The controller 142 includes an attention-position determining unit 1421, a depth identifying unit 1422, and a focal-length controller 1423. As illustrated in FIG. 4, the depth camera 11 and the control device 14 are connected, and image information and depth information are transmitted from the depth camera 11 to the controller 142. Moreover, as illustrated in FIG. 4, the variable focus lens 12 is connected to the control device 14, and a control signal from the control device is transmitted to the variable focus lens 12. The controller 142 loads and executes a program (software) from the storage 141, to thereby implement the attention-position determining unit 1421, the depth identifying unit 1422, and the focal-length controller 1423, and performs processing thereof. The controller 142 may perform the processing by a single CPU, or may include multiple CPUs and perform the processing by the CPUs. Moreover, at least one of the attention-position determining unit 1421, the depth identifying unit 1422, and the focal-length controller 1423 may be implemented by a hardware circuit.

The attention-position determining unit 1421 determines an attention position in image information acquired by the depth camera 11. The attention position is a position in the image information estimated that a user of the automatic focus-adjusting glasses 10 pays attention in the image information acquired by the depth camera 11. For example, in the image information acquired by the depth camera 11, if an object in which a degree of brightness variation per unit area in image information, such as text, is high is captured, it is estimated that a user pays attention thereto, and a position thereof in the image information may be determined as an attention position. This is because humans have a tendency to fixate on a specific object such as text, and the specific object tends to have a high degree of brightness variation. The attention-position determining unit 1421 is not limited to determine a position of object having a high degree of brightness variation, such as text, in the image information as the attention position, but may determine any other positions as the attention position.

First Mode of Processing of Attention-Position Determining Unit

FIG. 5 is a flowchart illustrating a first mode of processing of the attention-position determining unit. The attention-position determining unit 1421 calculates a degree of brightness variation in a unit area of an image in the image information acquired by the depth camera 11, and sets a subject region that includes the unit area having the degree of brightness variation equal to or higher than a threshold as an attention position. Hereinafter, the first mode of the processing of the attention-position determining unit 1421 will be explained using FIG. 5.

The attention-position determining unit 1421 performs an object detection processing with respect to image information, and sets a subject region that signifies a region including a detected object (step S100). The subject region is a region that occupies a certain range in the image information that is acquired by performing the object detection processing with respect to the image information, and by estimating a rectangle called bounding box that contains the identified object. That is, the subject region is a region including the object in the image information. The object detection is performed by extracting fixed-size windows from all possible positions of the image information, and by inputting these regions into an image classifier. Specifically, for the object detection, for example, a method such as region-based convolutional neural network (R-CNN) can be used. In R-CNN, object detection is performed by a procedure described in the following. First, a candidate region is searched for from image information by using selective-search, which is a method to find objectness. All of the region candidates are resized into a predetermined size, and are input to a convolutional neural network (CNN), to extract features. A training model is generated by using multiple support vector machines (SVM) with the extracted features, and by inputting the image information into the training model, a position of the bounding box containing an object in the image information can be estimated. Thus, the object detection from the image information can be performed while reducing a calculation load of CNN.

When the subject region is extracted from the image information, the attention-position determining unit 1421 calculates a degree of brightness variation in a unit area of an image in the image information (step S110). The unit area is a region that occupies a certain area arbitrarily set in an image. For example, suppose that an image is a 4K image of 3840 pixels in height and 2160 pixels in width. In this case, the attention-position determining unit 1421 may divide the image, for example, into 384 segments vertically and 216 segments horizontally, to form a region of 10 pixels in height and 10 pixels in width as a unit area. After dividing the image information into the unit areas, the attention-position determining unit 1421 calculates a degree of brightness variation in each of the unit areas of the image in the image information. The attention-position determining unit 1421 may use an amount of variation in distribution of brightness in a unit area of an image as the degree of variation. The amount of variation is a value indicating a spread of brightness distribution. For example, it is also possible to determine a degree of brightness variation within a unit area by using summary statics for brightness distribution, such as standard deviation, variance, maximum value-minimum value, interquartile range, and percentile value.

After calculating the degree of brightness variation within a unit area of the image in the image information, the attention-position determining unit 1421 determines whether the degree of brightness variation in each unit area is equal to or higher than a first threshold, and selects unit areas having the degree of brightness variation equal to or higher than the first threshold (step S120). The first threshold can be set to an arbitrary value.

After selecting the unit areas having the degree of brightness variation in the unit area equal to or higher than the first threshold in the image in the image information, the attention-position determining unit 1421 sets a subject region in which a rate of the unit area having the degree of brightness variation equal to or higher than the first threshold is highest as the attention position among the unit regions included in the subject region (step S130). Since the subject region is a region that occupies a certain range in the image information, the attention position may be set to any position in the subject region. For example, a position of a center of the subject region may be set as the attention position. Note that when a subject region including the unit area having the degree of brightness variation equal to or higher than the first threshold is just one, the processing of selecting one having the highest rate of the unit area as at step S130 is not necessary.

Second Mode of Processing of Attention-Position Determining Unit

FIG. 6 is a flowchart illustrating a second mode of the processing of the attention-position determining unit. When the subject region including a unit area having the degree of brightness variation equal to or higher than the first threshold is positioned in a central region of an image, the attention-position determining unit 1421 sets the subject region to the attention region. That is, in the first mode, when multiple subject regions, each of which includes the unit areas having the degree of brightness variation equal to or higher than the first threshold, are present, a subject region in which the rate of the unit area having the degree of brightness variation equal to or higher than the first threshold is largest is set as the attention region. The second mode differs from the first mode in a point in which a subject region positioned in a central region is set as the attention position. In the following, the second mode of the processing of the attention-position determining unit 1421 will be explained by using FIG. 6.

The second mode of the processing of the attention-position determining unit 1421 is same at step S200 to step S220 as the processing at step S100 to step S120 of the first mode and, therefore, explanations thereof are omitted. When the unit areas, the degree of brightness variation of which is equal to or higher than the first threshold are selected at step S220, the attention-position determining unit 1421 identifies a subject region in which a rate of the unit area having the degree of brightness variation equal to or higher than the first threshold is equal to or higher than a second threshold (step S230). The second threshold may be set to an arbitrary value but, for example, may be set to 60%.

When the subject region in which the rate of the unit area having the degree of brightness variation equal to or higher than the first threshold is equal to or higher than the second threshold is identified, the attention-position determining unit 1421 sets, when the subject region in which the rate of the unit area having the degree of brightness variation equal to or higher than the first threshold is equal to or higher than the second threshold is positioned in a central region, the central region as the attention region (step S240). The central region is a region that occupies a certain range including a central position in the image information. For example, when an image is a 4K image, a range that extends 50 pixels to the left and right, and 50 pixels upward and downward from the central position may be determined as the central region. Moreover, when the size of the subject region is larger than the central region, the central region may be determined as the attention position when a certain range, for example, 60%, of the subject region is included in the central region.

As described, when a subject having a high degree of brightness variation, such as text, is captured in the central region of an image that is considered to be easily paid attention of a user to, the central region can be determined as the attention position. That is, when a subject that attracts attention of a user, such as text, is captured in the central region of an image, it is possible to adjust the focal length to a depth of the subject position in the central region. As described, in the second mode, when multiple subject regions, each of which includes the unit area the degree of brightness variation of which is equal to or higher than the first threshold, is present, a subject region in which the rate of occupancy of the unit area is equal to or higher than the second threshold and which is positioned in the central region is determined as the attention position. By thus setting the second threshold, for example, a subject region in which the rate of occupancy of the unit area having the degree of brightness variation equal to or higher than the first threshold is low but which is positioned in the central region can be excluded from the attention position, and another subject region in which the rate of occupancy of the unit area having the degree of brightness variation equal to or higher than the first threshold is high can be set as the attention position and, therefore, it is preferable. However, in the second mode, it is not limited to set the second threshold. For example, among the subject regions each of which includes the unit area having the degree of brightness variation equal to or higher than the first threshold, the subject region that is positioned in the central region may be set as the attention position. Moreover, the second mode is also applicable to a case in which a subject region that includes the unit area having the degree of brightness variation equal to or higher than the first threshold is just one. In this case, for example, when the one subject region is positioned in the central region, it is set as the attention position, and when the one subject region is not positioned in the central region, it is not necessary to set the attention position.

Third Mode of Processing of Attention-Position Determining Unit

FIG. 7 is a flowchart illustrating a third mode of the processing of the attention-position determining unit. The attention-position determining unit 1421 detects an object by performing an object detection processing with respect to image information, identifies a depth of the object based on a position in the image information of a subject region that includes the detected object, calculates a change rate of the depth of the object per unit time, and sets a position of the object as the attention position when the change rate of the depth per unit time is equal to or higher than a threshold. In the following, the third mode of the processing of the attention-position determining unit 1421 will be explained by using FIG. 7.

The attention-position determining unit 1421 performs the object detection processing with respect to the image information, and sets a subject region that signifies a region including a detected object (step S300). Since the object detection processing is similar to that of step S100 in the first mode of the processing of the attention-position determining unit 1421, the explanation thereof is omitted.

When the subject region is set, the attention-position determining unit 1421 identifies a depth of the subject region based on a position of the subject region in an image (step S310). Identification of the depth of the subject region is performed by the depth identifying unit 1422 described later based on the position of the subject region in the image information. The attention-position determining unit 1421 inputs the position of the subject region in the image information into the depth identifying unit 1422, and acquires a depth output from the depth identifying unit 1422. Processing of the depth identifying unit 1422 will be described later.

When the depth of the subject region is identified, the attention-position determining unit 1421 calculates a change rate of the depth per unit time of the subject region (step S320). The attention-position determining unit 1421 calculates the change rate of the depth per unit time based on a depth acquired for each frame of the subject region. That is, when the frame rate of the image information is 30 fps, the change rate of the depth per ⅟₃₀ second will be calculated.

When the change rate of the depth per unit time of the subject region is calculated, the attention-position determining unit 1421 sets a subject region in which the change rate of the depth per unit time is equal to or higher than a third threshold as the attention position (step S330). The third threshold may be set to an arbitrary value, but may be set to, for example, 60 km/hr. The change rate of depth herein may refer to the depth becoming shallower, in other words, the object approaching.

Thus, when an object approaching at a high speed toward a user is captured in the image information, a position of the object can be set as the attention position. Furthermore, by identifying the depth of the object by the depth identifying unit 1422 described later based on the position of the object set as the attention position, and by adjusting the focal length of the variable focus lens 12, it is possible to adjust the focal length to focus on the object that is approaching at a high speed. It is only necessary for the attention-position determining unit 1421 to perform at least one of the identifications of the attention position by the first mode to the third mode explained above. Moreover, the attention-position determining unit 1421 may combine the identification of the attention position by the first mode to the third mode. That is, for example, the attention-position determining unit 1421 may be configured to adjust the focal length of the variable focus lens 12, setting the central region as the attention position by the second mode, and to switch thereafter, when the change rate of the depth of the object becomes equal to or higher than the third threshold in another subject region, that is, when the object is approaching, the attention position to that subject region.

Other Modes of Processing of Attention-Position Determining Unit

Furthermore, the attention-position determining unit 1421 is not limited to perform setting of the attention region by the first mode to the third mode. The attention-position determining unit 1421 sets a subject region in which a predetermined object is present as the attention region in the image information. More specifically, the predetermined object is, for example, text or the like, but is not limited thereto. The attention-position determining unit 1421 reads information relating to the predetermined object from the storage 141. The attention-position determining unit 1421 performs a pattern matching processing with respect to the image information acquired by the depth camera 11 based on the information relating to the predetermined object, to identify a text. The attention-position determining unit 1421 sets a subject region in which the identified text is present as the attention position in the image information. Furthermore, the attention-position determining unit 1421 may detect a subject region in which the predetermined object is present by the object detection processing explained in the first mode, and may determine the subject region as the attention position.

When it is found that texts are present in subject regions that are apart from each other by predetermined pixels or more as a result of performing the pattern matching processing or the object detection processing with respect to the image information acquired by the depth camera 11, those are separately identified as the subject regions in which the texts are present. When two or more subject regions in each of which the text is present are identified, the attention-position determining unit 1421 may set the subject region that is positioned closer to the central region of the image as the attention position. Thus, an object that is conceivable that people may want to pay attention to can be selected since a human tends to place an object to be focused on at a center of the field of view.

The depth identifying unit 1422 identifies the depth of the attention position based on the attention position in the image information that is determined by the attention-position determining unit 1421 and the depth information recorded for each position in the image information. As described previously, in the depth information acquired by the depth camera 11, a depth of an object captured in image information is recorded for each position in the image information.

Figure 9:
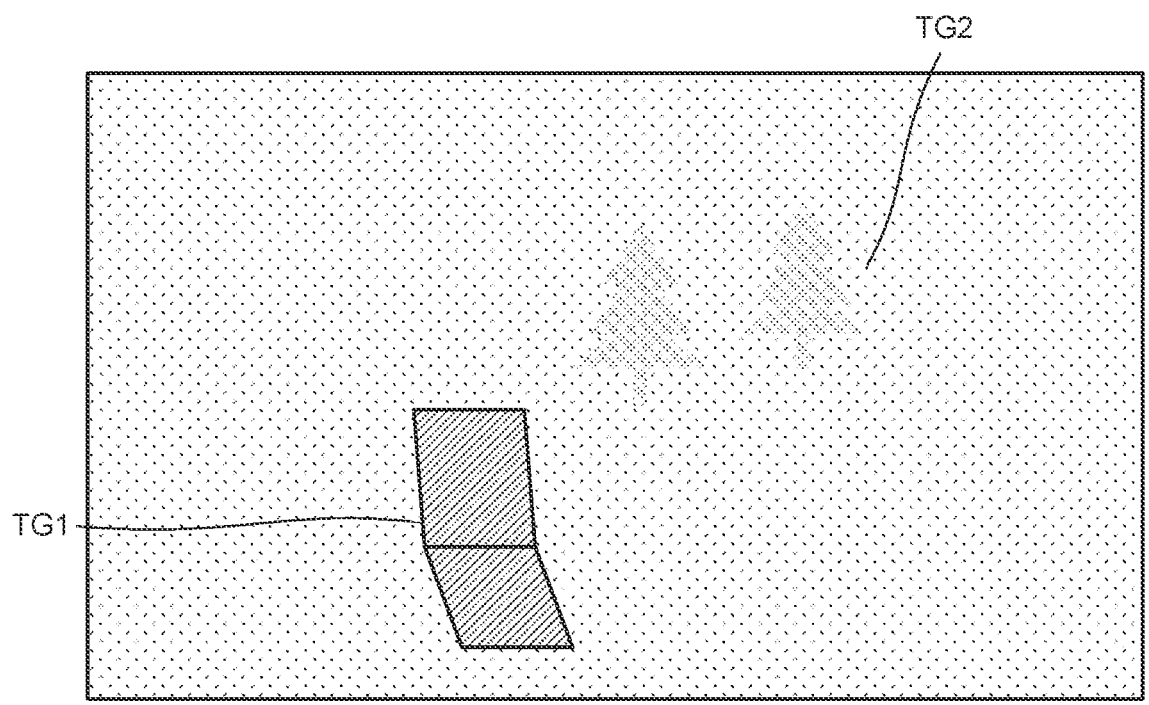
FIG. 9 is a schematic diagram visually illustrating depth information acquired by a depth-information acquiring unit of the automatic focus-adjusting glasses according to the present application.

Before explaining about the processing of the depth identifying unit 1422, the image information and the depth information will be explained by FIG. 8 and FIG. 9. FIG. 8 is a schematic diagram illustrating the image information acquired by the imager of the automatic focus-adjusting glasses according to the present application. FIG. 8 illustrates an image capturing the short distance object TG1 and the long distance object TG2 as an example. FIG. 9 is a schematic diagram visually illustrating the depth information acquired by the depth-information acquiring unit of the automatic focus-adjusting glasses according to the present application. In FIG. 9, an object far from the depth camera 11 is displayed in a bright color, and an object close to the depth camera 11 is displayed in a dark color. As illustrated in FIG. 9, the depth information is provided by recording a depth of an object captured in the image information for each position in the image information.

Therefore, if a position in the image information of the object captured in image information is known, its depth can be identified. The depth identifying unit 1422 identifies the depth of the attention position by the depth information acquired by the depth camera 11 based on the attention position in the image information that is determined by the attention-position determining unit 1421.

The focal-length controller 1423 sets a focal length of the variable focus lens 12 based on the depth of the attention position. That is, the focal-length controller 1423 calculates a focal length of a lens system of the automatic focus-adjusting glasses 10 based on the depth of the attention position in the image information, generates a control signal to adjust the focal length of the variable focus lens 12 based thereon, and transmits the control signal to the variable focus lens 12. By the control signal generated by the focal-length controller 1423, the variable focus lens 12 is controlled, and the depth of the attention position is determined as the focal length of the variable focus lens 12.

Configuration and Effect of Automatic Focus-Adjusting Glasses

The automatic focus-adjusting glasses 10 according to the present application include: an imager configured to be capable of acquiring image information; a variable focus lens 12 configured to be capable of changing a focal length; a depth-information acquiring unit configured to acquire depth information of each position of the image information acquired by the imager; an attention-position determining unit 1421 configured to determine an attention position in the image information acquired by the imager; a depth-information identifying unit 1422 configured to identify a depth of the attention position based on the attention position in the image information determined by the attention-position determining unit 1421 and the depth information;

and a focal-length controller 1423 configured to set a focal length of the variable focus lens 12 based on the depth of the attention position.

According to this configuration, an attention position in the image information can be determined, and the focal length of the variable focus lens 12 can be set based on the depth of the attention position. Therefore, the automatic focus-adjusting glasses 10 that can adjust the focal length automatically without sacrificing practicality can be provided.

The attention-position determining unit 1421 is further configured to calculate a degree of brightness variation in a unit area of an image in the image information acquired by the imager, and to set a subject region that includes a unit area having the degree of brightness variation equal to or higher than a threshold as the attention position.

According to this configuration, a subject region that includes a unit area having the degree of brightness variation equal to or higher than the threshold is set as the attention position among subject regions in each of which an object has been detected in the image information, and the focal length of the variable focus lens 12 can be set to match the depth of the attention position.

The attention-position determining unit 1421 is further configured to set, when the subject region that includes the unit area having the degree of brightness variation equal to or higher than the threshold is positioned in a central region of the image, the subject region as the attention position.

According to this configuration, from among the subject regions in each of which the object has been detected in the image information, the subject region that includes the unit area having the degree of brightness variation equal to or higher than the threshold is positioned in the central region of an image is set as the attention position, and the focal length of the variable focus lens 12 can be set to match the depth of the attention position.

The attention-position determining unit 1421 is further configured to: detect an object by performing an object detection processing with respect to the image information; identify a depth of the object based on a position of a subject region that includes the detected object in the image information; calculate a change rate of the depth per unit time of the object; and set a position of the object as the attention position when the change rate of the depth per unit time is equal to or higher than a threshold.

According to this configuration, when the subject region that includes the object having the change rate of the depth equal to or higher than the threshold is captured in image information, the subject region is set as the attention position, and the focal length of the variable focus lens 12 can be set to focus on the depth of the attention position. Therefore, for example, when there is an object approaching a user, the focal length of the variable focus lens 12 can be adjusted to focus on the approaching object.

A control method of the automatic focus-adjusting glasses 10 according to the present application is a control method of the automatic focus-adjusting glasses 10 including an imager configured to be capable of acquiring image information and a variable focus lens 12 configured to be capable of changing a focal length, the method comprising: acquiring depth information of each position in the image information acquired by the imager; determining an attention position in the image information acquired by the imager; identifying a depth of the attention position based on the attention position in the image information and the depth information; and setting the focal length of the variable focus lens based on the depth of the attention position.

According to this configuration, the control method of the automatic focus-adjusting glasses 10 that enables the automatic adjustment of the focal length can be provided without sacrificing practicality.

A non-transitory storage medium according to the present application stores a computer program that causes a computer to execute a control method of the automatic focus-adjusting glasses 10 that include an imager configured to be capable of acquiring image information and a variable focus lens 12 configured to be capable of changing a focal length, the control method comprising: acquiring depth information of each position in the image information acquired by the imager; determining an attention position in the image information acquired by the imager; identifying a depth of the attention position based on the attention position in the image information and the depth information; and setting the focal length of the variable focus lens based on the depth of the attention position.

According to this configuration, the automatic focus-adjusting program that can adjust the focal length automatically can be provided without sacrificing practically.

According to the present application, the automatic focus-adjusting glasses that can adjust the focal length automatically can be provided without sacrificing practicality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. Automatic focus-adjusting glasses comprising:
   an imager configured to be capable of acquiring image information;
   a variable focus lens configured to be capable of changing a focal length;
   a depth-information acquiring unit configured to acquire depth information of each position of the image information acquired by the imager;
   an attention-position determining unit configured to determine an attention position in the image information acquired by the imager;
   a depth-information identifying unit configured to identify a depth of the attention position based on the attention position in the image information determined by the attention-position determining unit and the depth information; and
   a focal-length controller configured to set a focal length of the variable focus lens based on the depth of the attention position,
   wherein the attention-position determining unit is further configured to:
   calculate a degree of brightness variation in a unit area of an image in the image information acquired by the imager;
   set a subject region that includes a unit area having the degree of brightness variation equal to or higher than a first threshold as the attention position;
   detect an object by performing an object detection processing with respect to the image information;
   identify a depth of the object which is a distance between the imager and the object based on a position of a subject region that includes the detected object in the image information;
   calculate a change rate of the depth per unit time of the object;

switch the attention position to a position of the object when the subject region which includes the unit area having the degree of brightness variation equal to or higher than the first threshold is set as the attention position and when the change rate of the depth per unit time in an approaching direction to the object is equal to or higher than a third threshold; and set, when the subject region in which a rate of occupancy of the unit area having the degree of brightness variation equal to or higher than the first threshold is equal to or higher than a second threshold is positioned in a central region of the image, the subject region as the attention region.

2. A control method of automatic focus-adjusting glasses that include an imager configured to be capable of acquiring image information, and a variable focus lens configured to be capable of changing a focal length, the control method comprising:

acquiring depth information of each position in the image information acquired by the imager;

determining an attention position in the image information acquired by the imager;

identifying a depth of the attention position based on the attention position in the image information and the depth information; and setting the focal length of the variable focus lens based on the depth of the attention position, wherein the determining further comprising:

calculating a degree of brightness variation in a unit area of an image in the image information acquired by the imager;

setting a subject region that includes a unit area having the degree of brightness variation equal to or higher than a first threshold as the attention position;

detecting an object by performing an object detection processing with respect to the image information;

identifying a depth of the object which is a distance between the imager and the object based on a position of a subject region that includes the detected object in the image information;

calculating a change rate of the depth per unit time of the object;

switching the attention position to a position of the object when the subject region which includes the unit area having the degree of brightness variation equal to or higher than the first threshold is set as the attention position and when the change rate of the depth per unit time in an approaching direction to the object is equal to or higher than a third threshold; and setting, when the subject region in which a rate of occupancy of the unit area having the degree of brightness variation equal to or higher than the first threshold is equal to or higher than a second threshold is positioned in a central region of the image, the subject region as the attention region.

3. A non-transitory storage medium that stores a computer program that causes a computer to execute a control method of automatic focus-adjusting glasses that include an imager configured to be capable of acquiring image information and a variable focus lens configured to be capable of changing a focal length, the control method comprising:

acquiring depth information of each position in the image information acquired by the imager;

determining an attention position in the image information acquired by the imager;

identifying a depth of the attention position based on the attention position in the image information and the depth information; and setting the focal length of the variable focus lens based on the depth of the attention position, wherein the determining further comprising:

calculating a degree of brightness variation in a unit area of an image in the image information acquired by the imager;

setting a subject region that includes a unit area having the degree of brightness variation equal to or higher than a first threshold as the attention position;

detecting an object by performing an object detection processing with respect to the image information;

identifying a depth of the object which is a distance between the imager and the object based on a position of a subject region that includes the detected object in the image information;

calculating a change rate of the depth per unit time of the object;

switching the attention position to a position of the object when the subject region which includes the unit area having the degree of brightness variation equal to or higher than the first threshold is set as the attention position and when the change rate of the depth per unit time in an approaching direction to the object is equal to or higher than a third threshold; and setting, when the subject region in which a rate of occupancy of the unit area having the degree of brightness variation equal to or higher than the first threshold is equal to or higher than a second threshold is positioned in a central region of the image, the subject region as the attention region.

* * * * *